United States Patent
Okutsu et al.

(10) Patent No.: US 7,619,757 B2
(45) Date of Patent: Nov. 17, 2009

(54) IMAGE PROCESSING APPARATUS AND CONTROL METHOD THEREOF, PROCESSING MODULE DRIVE CONTROL METHOD, AND DATA PROCESSING APPARATUS

(75) Inventors: Toshihisa Okutsu, Kawasaki (JP); Masakazu Taneda, Kawasaki (JP); Toshiyuki Nakazawa, Tokyo (JP); Masami Tsunoda, Yokohama (JP); Yoshinori Ito, Tokyo (JP); Hideo Asahara, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 550 days.

(21) Appl. No.: 11/197,466

(22) Filed: Aug. 5, 2005

(65) Prior Publication Data
US 2006/0039028 A1 Feb. 23, 2006

(30) Foreign Application Priority Data
Aug. 6, 2004 (JP) ............................. 2004-231431

(51) Int. Cl.
- G06K 15/22 (2006.01)
- G06K 15/10 (2006.01)
- H04N 1/60 (2006.01)
- H04N 1/40 (2006.01)
- G03F 3/08 (2006.01)
- G06F 3/00 (2006.01)

(52) U.S. Cl. ............... 358/1.13; 358/1.15; 358/1.9; 358/518; 358/448; 719/327

(58) Field of Classification Search .......... None
See application file for complete search history.

(56) References Cited

U.S. PATENT DOCUMENTS

| | | | | |
|---|---|---|---|---|
| 4,825,461 | A | 4/1989 | Kurita et al. | 379/93 |
| 4,827,349 | A | 5/1989 | Ogata et al. | 358/256 |
| 5,598,533 | A | 1/1997 | Yokota et al. | 395/200.08 |
| 5,630,062 | A | 5/1997 | Okutsu | 395/200.03 |
| 6,456,388 | B1 | 9/2002 | Inoue et al. | 358/1.15 |
| 6,747,753 | B1 | 6/2004 | Yamamoto | 358/1.15 |
| 2002/0054312 | A1* | 5/2002 | Tomita | 358/1.13 |
| 2002/0105664 | A1 | 8/2002 | Inoue et al. | 358/1.13 |
| 2004/0032611 | A1* | 2/2004 | Daly et al. | 358/1.13 |
| 2004/0109200 | A1 | 6/2004 | Yamamoto | 358/1.15 |

(Continued)

FOREIGN PATENT DOCUMENTS

EP   0 946 046 A2   12/1999

(Continued)

OTHER PUBLICATIONS

Mitsuya Tadahiko Printer Server Sep. 29, 1992 Japanese Publication 06-110627 Japanese Application 04-259815.*

Primary Examiner—Twyler L Haskins
Assistant Examiner—Barbara D Reinier
(74) Attorney, Agent, or Firm—Fitzpatrick, Cella, Harper & Scinto

(57) ABSTRACT

An image processing apparatus includes a number of processing modules which apply a process to predetermined data in inputted print data; a detecting unit configured to detect a processing module that has performed a process during processing by the plurality of processing modules of print data inputted in a predetermined mode; and a setting unit configured to make a setting that enables a processing module detected by the detecting unit, after the end of the predetermined mode.

26 Claims, 16 Drawing Sheets

U.S. PATENT DOCUMENTS

2004/0257390 A1  12/2004  Ito et al. ........................ 347/5
2006/0190496 A1   8/2006  Tsunoda ..................... 707/200

FOREIGN PATENT DOCUMENTS

| | | |
|---|---|---|
| EP | 0 966 046 A2 | 12/1999 |
| JP | 11-53132 | 2/1999 |
| JP | 11-282684 | 10/1999 |
| JP | 11-306107 | 11/1999 |
| JP | 2003-256216 | 9/2003 |
| JP | 2004-93215 | 3/2004 |

* cited by examiner

IMAGE PROCESSING APPARATUS AND CONTROL METHOD THEREOF, PROCESSING MODULE DRIVE CONTROL METHOD, AND DATA PROCESSING APPARATUS

FIELD OF THE INVENTION

The present invention relates to control of enablement of multiple processing modules contained in a data processing apparatus and is suitable for control of enablement of filter processing functions implemented on firmware of an image processing apparatus, for example.

BACKGROUND OF THE INVENTION

Software for image processing apparatuses has been built typically as firmware, which is static and fixed, on a real-time operating system (OS). Even if the firmware consists of multiple processing modules, the firmware is stored in a non-volatile memory of the apparatus with its entirety being statically linked to a single load module. During system startup, the firmware is loaded from a non-volatile memory such as a hard disk to a RAM and executed there, or is directly executed on a non-volatile memory such as a ROM. Firmware that configures a peripheral system such as a low-cost image processing apparatus, is typically configured so as not to dynamically load or link component modules from the viewpoints of cost-effectiveness and security. This is because the amount of memory for storing a symbol table required for dynamic linking and overhead relating to processing for resolving symbols to addresses can decrease cost-effectiveness of the system or additional submodules loaded and linked can compromise the quality and security of the entire system which have been adequately evaluated and achieved before the linkage of those submodules.

Image processing apparatuses have been developed in which an additional software operation environment is provided on a real-time OS of the firmware of peripheral system to support software functions such as dynamic loading, linking, and memory operations. The additional software operation environment includes an interpreter and a set of application programming interfaces (APIs) and frameworks, thereby providing a sort of OS or computing platform for software running on it. The interpreter sequentially reads, interprets, and executes a sequence of instructions in a given instruction set. Treating the instruction set on the same level as an instruction set for a hardware CPU, the interpreter is sometimes called a virtual machine.

The set of APIs and the frameworks provide the software running in the software operation environment with access to resources provided by the real-time OS lying under the software operation environment as well as resources that are abstractions of hardware resources. The resources include contexts in which the CPU executes instructions, a memory, file system, and input/output (I/O) devices, including a network interface. The instruction-execution context on an interpreters can be managed by the software operation environment by itself independently of a multi-tasking mechanism provided by the real CPU and the real-time OS. Similarly, the software operation environment can provide its own memory management.

Because software running in the software execution environment is sequentially read, interpreted, and executed by the interpreter, instruction strings can be monitored and operations that can adversely affect the system may be able to be removed during the course of the process. Also, access from software in the software execution environment to the resources manipulates the resources indirectly through the APIs and frameworks provided by the software execution environment and therefore operations that can affect the system may be able to be removed during the course of the access. Therefore, the approach to provide the inside of the firmware with the software execution environment layer consisting of the interpreter, APIs and frameworks is considerably effective for introducing dynamic features of software individually into the firmware of a low-cost peripheral system which basically should be configured in a static and fixed manner. (See Japanese Patent Application Laid-Open No. 11-282684 and No. 2003-256216.)

In the approach descried above, a Java (registered trademark) virtual machine can be used as the interpreter, and APIs and frameworks associated with Java (registered trademark) can be used to implement the software execution environment layer. The applicant has developed and commercialized MEAP (registered trademark) in 2003, which is a multifunctional image processing apparatus including a Java (registered trademark) platform inside its firmware.

An application-downloading printer containing a network computer and a computer network system including the printer have been disclosed. In that system, a data file to be printed and an application associated with the data file are downloaded to the printer and the application is activated on the network computer to open and convert the data file into a raster image, which is then printed. An implementation of the printer has been also disclosed in which the application is a Java (registered trademark) applet. Another implementation has been disclosed in which the application is pushed from a client along with a print data file. Yet another implementation has been disclosed in which the application is pulled by the printer from a source such as an application server. (See Japanese Patent Application Laid-Open No. 11-53132.)

A network communication system has been disclosed that connects onto a transmission line a number of peripheral devices, a number of terminal devices including software driving the peripheral devices, and a server device including at least a database concerning the software driving the peripheral devices and provides network communication according to a given communication protocol. Each of the peripheral devices includes a client control unit which requests and obtains up-to-date module information associated with all or part of the software driving the peripherals or with a module used by the software from the server device, and a software delivery agent which delivers the obtained up-to-date module information to the terminal devices. Also disclosed is an implementation in which a Java (registered trademark) applet or a Java (registered trademark) application can be supplied as a client module used by software driving the peripherals. (See Japanese Patent Application Laid-Open No. 11-306107.)

The applicant has proposed in the past the following technique based on the conventional techniques described above. There are diverse requirements in various customers' printing and various other environments. Once a mission-critical system has started to successfully operate, the customer may strongly desire to maintain the stability of the entire system, which can make it difficult to change a printer driver or application. Under such restrictions in real printing environments, the vendors of printers must provide printers having provisions for meeting diverse needs of customers, rather than asking customers to modify their environment. For example, if a new printer provides a new function such as a double-sided printing function, a binding function or other finishing functions, the new function can be used of course by (i) generating a print job including a command string for using the new function through a printer driver concurrently developed for the printer, or (ii) updating customer's business application in such a manner that its mules are not individually loaded or linked. However, there is demand that a new function of a printer be enabled by a provision on the printer without affecting the customer's system, as mentioned above.

One way to meet these customer demands by a printer without affecting customer's system may be to modify the firmware of a printer and release the printer as a customized product. This method is used in some cases in practice. However, customization by modifying firmware requires much development time and costs, including those for re-evaluation of the quality of the entire printer. Furthermore, updates of firmware incorporated in a printer already installed in a customer environment require a field engineer to perform maintenance tasks requiring an advanced technique. This is a drawback to quick response to customer demands as well as cost-effectiveness. In fact, some of the demands can be met by adding preprocessing in which a received data stream itself is altered before it is interpreted, without changing the entire firmware. Therefore, what is needed is a more dynamic mechanism making it possible to add software that implements the preprocessing before interpretation of a received print data stream, in a flexible and scalable manner and independently from the firmware.

MEAP (registered trademark) that includes a software operation environment layer like a Java (registered trademark) platform in firmware of a peripheral system is known. According to this conventional technique, embedded applications independent of firmware can be developed in a software operation environment of the apparatus and the printing function of the apparatus can be accessed from a Java (registered trademark) application through an API. However, because the Java (registered trademark) platform is located in the embedded application layer in the firmware, a print data receiving function or a print server function which are implemented as a native embedded application in the layer cannot be used for Java (registered trademark) applications. For example, a print server function in which print service protocols for receiving print data through a network must be also implemented on the Java (registered trademark) side, which is inefficient in terms of development and evaluation loads as well as the amount of memory during runtime.

In other conventional techniques that do not provide a software operation environment layer in firmware of a peripheral system, the system is dynamic in its entirety because the entire system can be dynamically linked and plugged in. Given that only a mechanism that flexibly and scalably adds preprocessing before interpretation of a received PDL data has to be dynamic, these conventional approaches are not suitable for low-price small system, because the overhead for building the entire system as dynamic software entails increased costs and the difficulty of assurance of quality.

Therefore, an approach has been proposed in which a filter unit that performs preprocessing of a PDL data stream received at a printer before interpretation of the PDL data stream is implemented as flexible and scalable software, and the software is distinctly separated from the remaining portions of printer firmware which requires stability. This configuration can improve the productivity of customization of PDL printers. (See Japanese Patent Application No. 2004-093215.)

The processing function of the filter unit is based on the prerequisite that only those filters in a filter unit that are appropriate for user's environment be selectively enabled. If the number of available filters is small, a setting for selectively enabling filters can be made by using an operation panel of the apparatus or a remote user interface through a network.

However, as the number of available filters increases, the manual filter enabling task becomes considerably cumbersome. Furthermore, it is difficult to give an explanation of all available filters to operators, which makes it difficult to perform enabling tasks.

SUMMARY OF THE INVENTION

The present invention has been made in light of these problems and an object of the present invention is to make it possible to enable processing modules with a considerably simple operation without a manual setup task for enabling the processing modules individually.

According to one aspect of the present invention, there is provided an image processing apparatus comprising: a plurality of processing modules which apply a process to predetermined data in inputted print data; a detecting unit configured to detect a processing module that has effectively performed a process during processing by the plurality of processing module of print data inputted in a predetermined mode; and a setting unit configured to make a setting that enables a processing module detected by the detecting unit, after the end of the predetermined mode.

Furthermore, according to another aspect of the present invention, there is provided an image processing apparatus comprising: a plurality of processing modules which apply a process to inputted print data, each of the plurality of processing modules performing a process for detecting and replacing predetermined data in inputted print data if an enable flag of the processing module is in the on state and, if the processing module has replaced data, setting an execution flag of the processing module; and a control unit configured to turn on the enable flags of all of the plurality of processing modules at the start of a predetermined mode, provide print data to the plurality of processing modules, and maintain the on state of only the enable flag of a processing unit whose execution flag is in the on state at the end of the predetermined mode.

Other and further objects, features and advantages of the present invention will be apparent from the following descriptions taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principle of the invention.

DETAILED DESCRIPTION OF THE PREFERRED EMBODIMENTS

Preferred embodiments of the present invention will be described below with reference to the accompanying drawings.

First Embodiment

An image processing apparatus according to one embodiment of the present invention will be described below with reference to the drawings.

Figure 1:
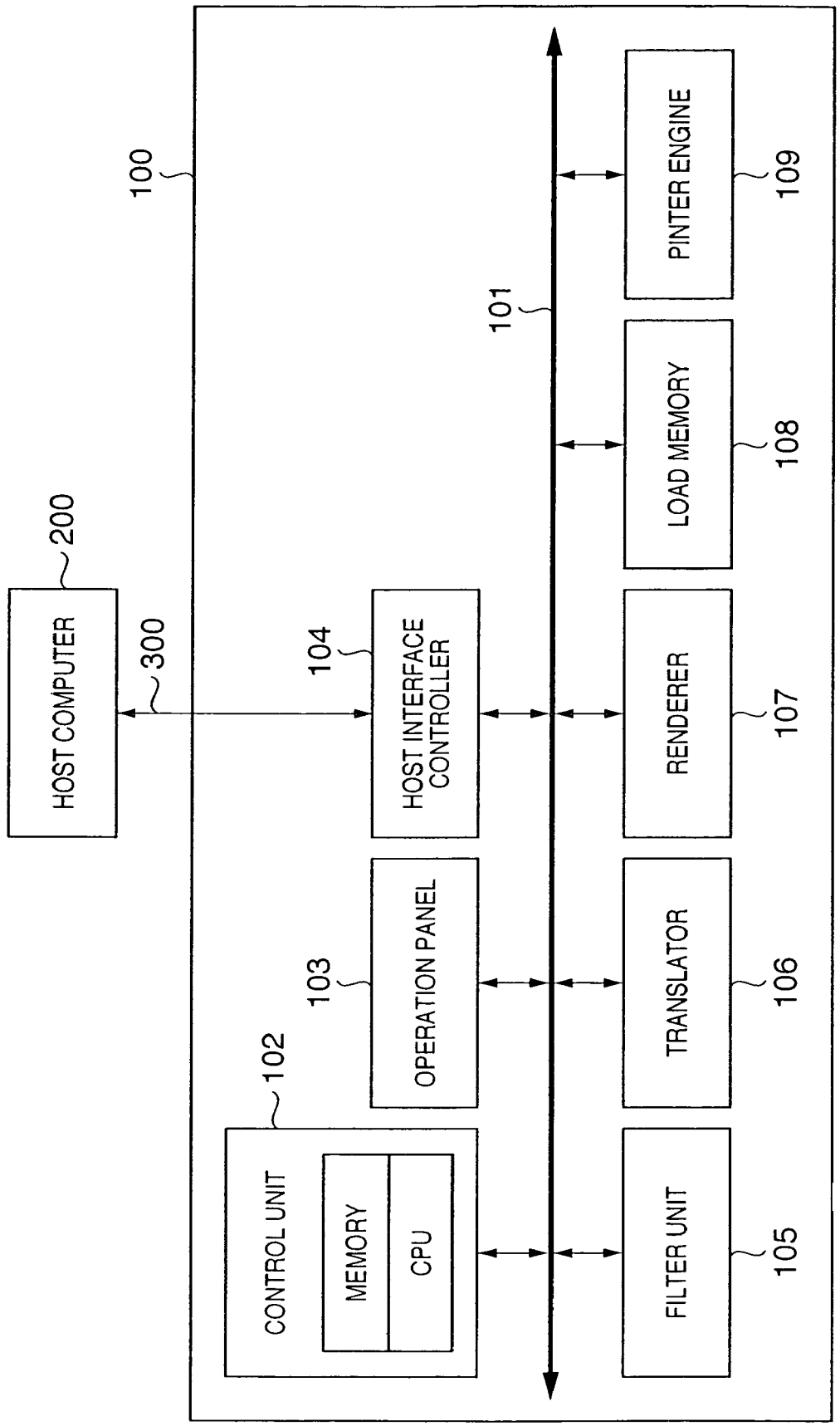
FIG. 1 is a block diagram showing a configuration of a printer according to an embodiment of the present invention.

FIG. 1 is a detailed block diagram of a printer of the present invention. As shown in FIG. 1, the printer 100 includes the following blocks interconnected through an internal main bus 101. A control unit 102, which includes a Central Processing Unit (CPU) and a memory, unit, executes control programs stored in the memory to control the entire printer 100. An operation panel 103 receives instructions for setting an operation mode and making various other settings for the printer 100 from an operator. A host interface controller 104 has a computer network communication function such as Ethernet (registered trademark) communication and connects the printer 100 to a host computer 200 through a computer network 300 so that they can communicate with each other. The communication function is used for transferring a print job from the host computer 200 connected through the computer network. Any of other interface methods that enable the printer to connect to the computer may be used.

A print job received at the host interface controller 104 is transferred to a filter unit 105. The filter unit 105 performs data replacement, that is, filtering of received PDL print job data by using particular data pattern matching or other algorithms. One or more filters can be coupled to the filter unit 105. The PDL print job subjected to the filtering is sent to a translator 106. Details of the filtering unit 105 will be described later with reference to FIG. 2.

The translator 106 interprets print data written by PDL and translates it into descriptions in a print intermediate language suitable for rendering. The print data descriptions in the print intermediate language suitable for rendering is called a display list. Different translators 106 have different unique implementations according to different PDL specifications.

Every translator translates PDL data into a display list specific to a renderer. The translated display list is sent to a renderer 107.

The renderer 107 renders a display list as a raster image. A load memory 108 stores a raster image rendered by the renderer 107. That is, a raster image the renderer 107 obtained is stored in the load memory 108. A printer engine 109 generates a permanent visible image on paper from the raster image stored in the load memory 108.

Figure 2:
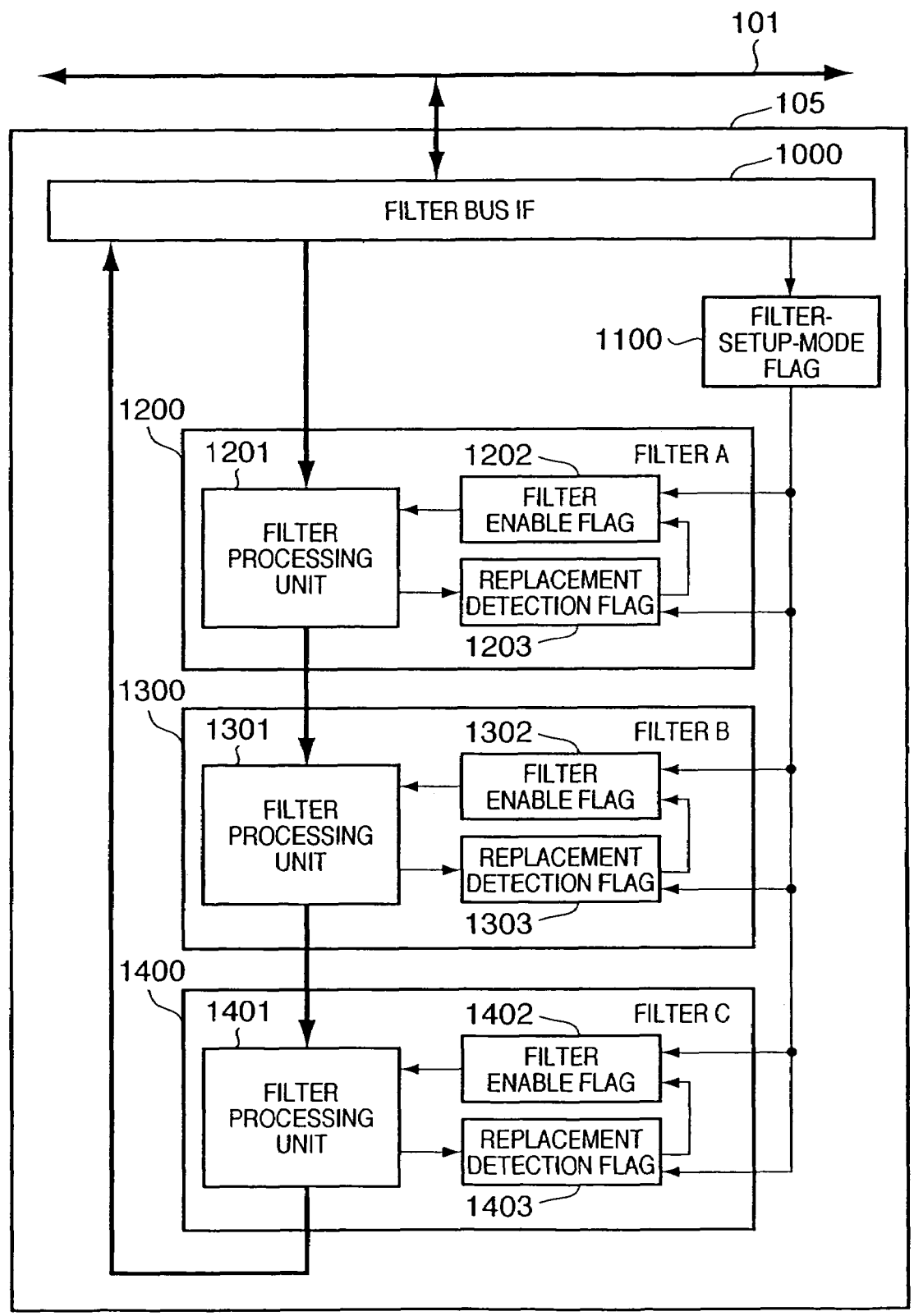
FIG. 2 is a block diagram showing a configuration of a filter unit in the printer according to the embodiment.

FIG. 2 is a block diagram showing a detailed configuration of the filter unit 105. As mentioned earlier, one or more filters can be coupled to the filter unit 105. While three filters are coupled in the example shown in FIG. 2, the number of filters is not so limited. Any number of filters that have an identical configuration can be coupled to the filter unit 105.

A filter bus interface 1000 in FIG. 2 enables data input and output to and from other blocks through the internal bus 101 of the printer. More specifically, a PDL print job received at host interface 104 is inputted into the filter unit 105 through the filter bus interface 1000. The PDL print job subjected to filter processing in the filter unit 105 is outputted to the translator 106, which is in the subsequent stage, via the filter bus interface 1000.

A filter-setup-mode flag 1100 indicates that filter-setup mode is entered to each filter module. The filter-setup-mode flag 1100 has two states, true and false. "True" indicates the filter-setup mode and "false" indicates the normal operation mode.

Reference numerals 1200, 1300, and 1400 indicate filter modules provided in the filter unit 105. Each of the filter modules (1200, 1300, 1400) includes a filter processing unit (1201, 1301, 1401), a filter enable flag (1202, 1302, 1402), and a replacement detection flag (1203, 1304, 1404). Filter module 1200 corresponding to a filter A will be described in detail below as a typical example. The other filter modules 1300 and 1400 have basically the same configuration. However, the filter processing units 1201, 1301, 1401 perform different filter processing.

The filter processing unit 1201 in the filter module 1200 performs particular filter processing on PDL print job data inputted. For example, it replaces matching data in data pattern matching with other data. The filer enable flag 1202 controls whether filter processing should be applied to input data in the filter processing unit 1201 or the input data should be directly outputted without performing filter processing (by bypassing filter processing). If the filter enable flag 1202 is "true", filter processing is enabled; if "false", then filter processing is disabled, that is, a bypass mode is entered. In the bypass mode, data can be quickly passed to the subsequent processing because filtering process is not performed. Therefore, by setting the enable flag of a filter module not to use to "false", fast processing can be achieved. The replacement detection flag 1203 is set to "true" if filter processing by the filter processing unit 1201 is actually performed. If PDL data has undergone filtering process but any portion of the data has not been replaced, then the replacement detection flag 1203 remains "false".

Figure 3:
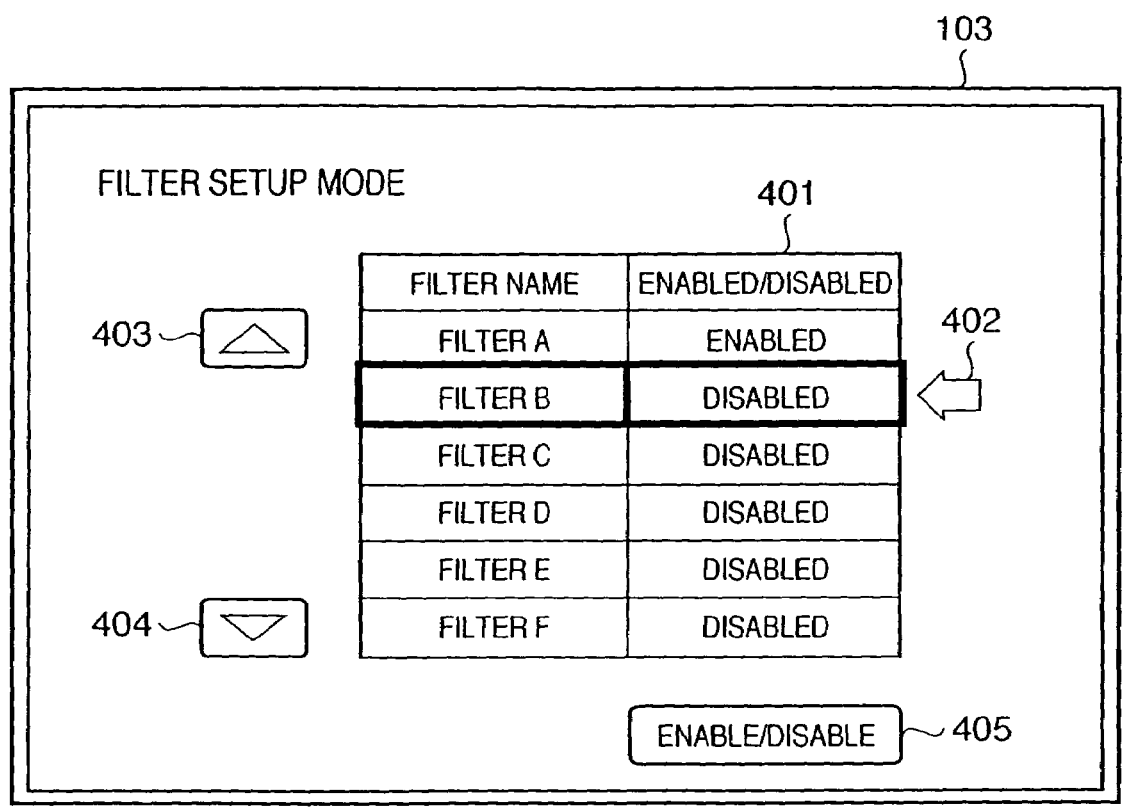
FIG. 3 shows an exemplary user interface for manual filter setup.

FIG. 3 shows an exemplary user interface for manual filter setup. A user interface as shown in FIG. 3 has been used widely for filter setting up. FIG. 3 shows a display unit of an operation panel 103 of the printer 100. The list 401 shown in FIG. 3 lists the filters installed on the printer 100. The Up button 403 and the Down button 404 are used to select a filter name. The filter indicated by arrow 402 is currently selected as a filter function to be enabled or disabled with the Enable/Disable button 405

The arrangement for enabling or disabling filter modules individually as shown in FIG. 3 has been widely used for enabling or disabling filter functions. This arrangement requires an operator to acquire a detailed knowledge about the processing performed by the individual filter modules installed on the printer 100 before the operator can enable or disable a filter module in order to customize the printer 100 to suit a user. As the number of filter modules installed increases, this task will become burdensome to the operator and unrealistic.

Figure 4:
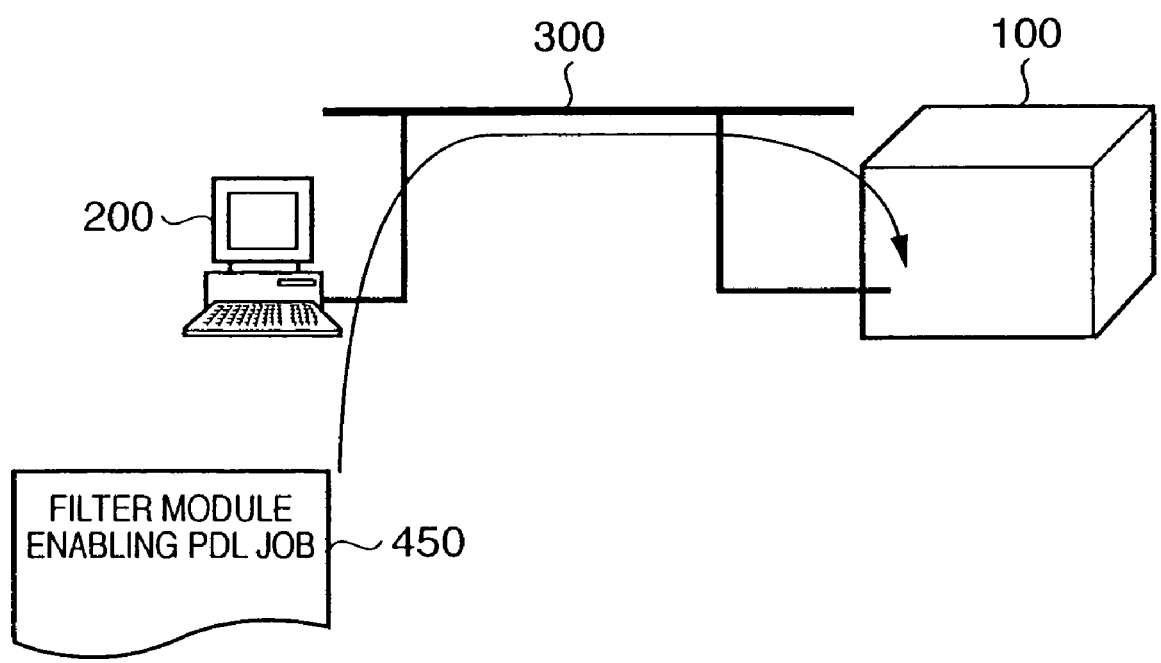
FIG. 4 is a diagram for illustrating a filter setup concept according to a first embodiment.

FIG. 4 schematically shows a filter setup procedure according to the present embodiment. FIG. 4 illustrates how a filter module enabling PDL job 450 is sent from the host computer 200 to the printer 100 over the computer network 300. A filter module enabling job 450 is a PDL job for an operator to selectively enable a filter or filters provided in the filter unit 105 of the printer 100. That is, the PDL job contains data that causes filtering process (data replacement) to be performed in a filter or filters to be enabled among the filters provided in the filter unit 105. The PDL job is provided from the printer development department to an operator in a service department for the purpose of customizing filter enablement to suit each user. In this way, in the present embodiment a PDL job itself in which data replacement is performed by a filter module is used to enable the filter module, instead of defining any special command for enabling each individual filter.

Figure 5:
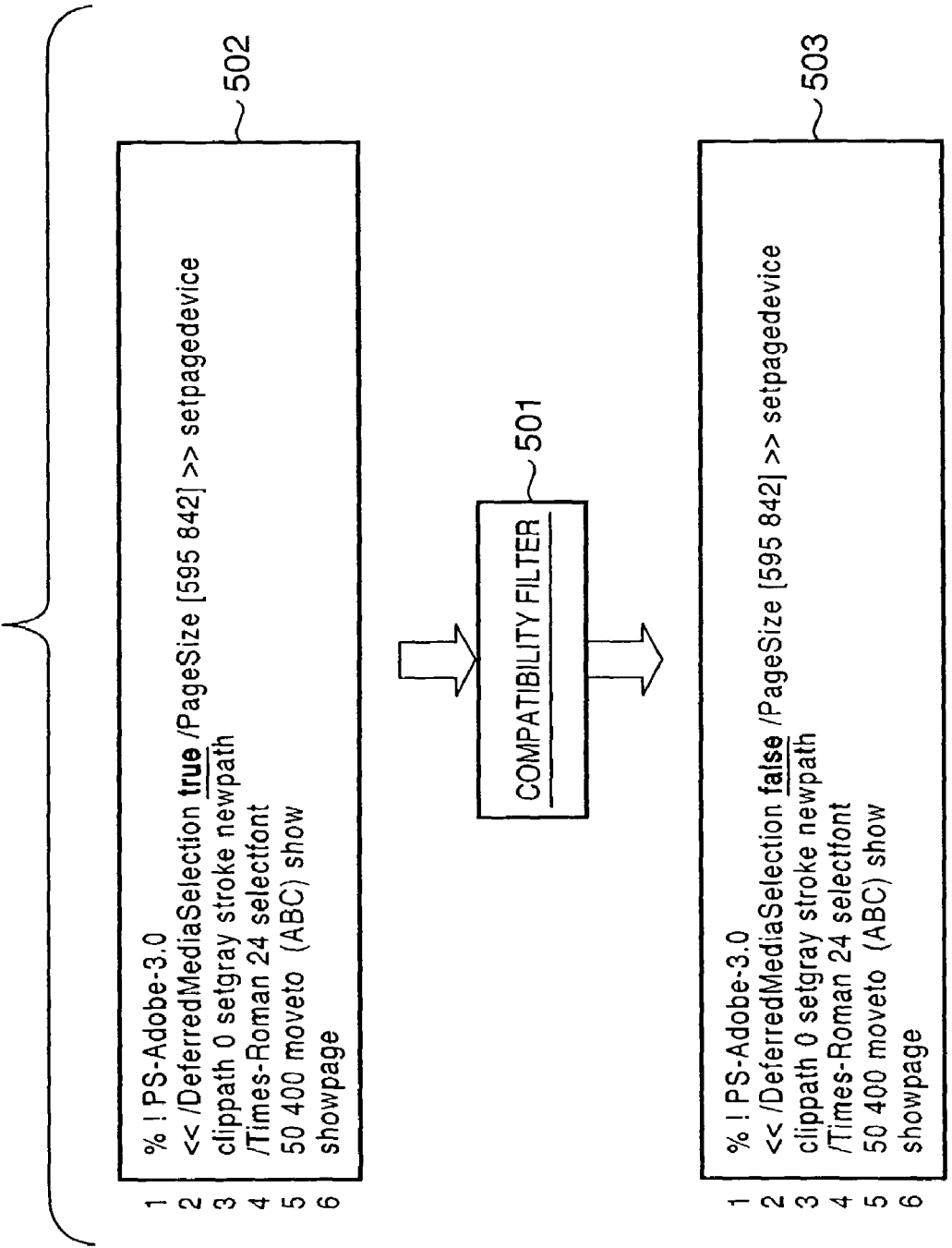
FIG. 5 is a diagram for illustrating a process performed by a compatibility filter, which is an exemplary filter module in the embodiment.

FIG. 5 is a diagram illustrating a process performed by a compatibility filter, which is an exemplary filter module in the present embodiment. A compatibility filter module 501 is an exemplary component corresponding to a filter processing unit 1201, 1301, 1401. The compatibility filter module 501 reads an input stream, performs processing for solving a compatibility problem in the data stream, and writes data in an output stream.

An example will be described in which a compatibility problem due to differences in interpretation among interpreters for Adobe PostScript-compatible PDL, which is a typical PDL, from different vendors is solved. For example, a printer from a certain vendor displays a custom-paper request on its display panel if /DeferredMediaSelection in setpagedevice of PostScript is true. On the other hand, if /DeferredMediaSelection is false, the printer searches for standard-size paper within a tolerance of ±5 from a specified size and, the printer cannot find such standard-size paper, it follows the policy of PostScript. A printer from another vendor searches for paper of an exact specified standard size (without tolerance) if /DeferredMediaSelection is true, and, if the printer cannot find such standard-size paper, it interprets the paper of the specified size as custom-size paper. On the other hand, if it is false, the printer searches for standard-size paper within a tolerance of ±5 and, if the printer cannot find such paper, it follows the policy of PostScript. If an infrastructure environment for a mission-critical system from yet another vender is built on the assumption that printers behave according to the latter interpretation, a printer of the former type in the system will respond to a print request in an unexpected situation by assuming custom-size paper and display an "out of paper" message on its display panel without performing printing, which is disadvantageous to customers.

In this situation, the vendor of the printer of the former type must provide customers with a solution to the compatibility problem at minimal costs in minimal time. This requirement can be met at least in a provisional manner by changing the /DeferredMediaSelection parameter in setpagedevice appearing in a print request data stream from true to false. The compatibility filter module 501 acts for solving this problem. In particular, the compatibility filter module 501 performs pattern matching on an input data stream to find "setpagedevice" for which "/DeferredMediaSelection true" is set and if there is a match, outputs a data stream in which "true" is replaced with "false".

Reference numeral 502 in FIG. 5 indicates an exemplary data stream, PostScript print data, inputted into a filter. Partial data that matches the pattern described above is appearing on the second line. Reference numeral 503 indicates an exemplary data stream outputted from the filter, which is the PostScript data subjected to filter processing. The character string "true" on the second line has been replaced with "false".

Figure 6:
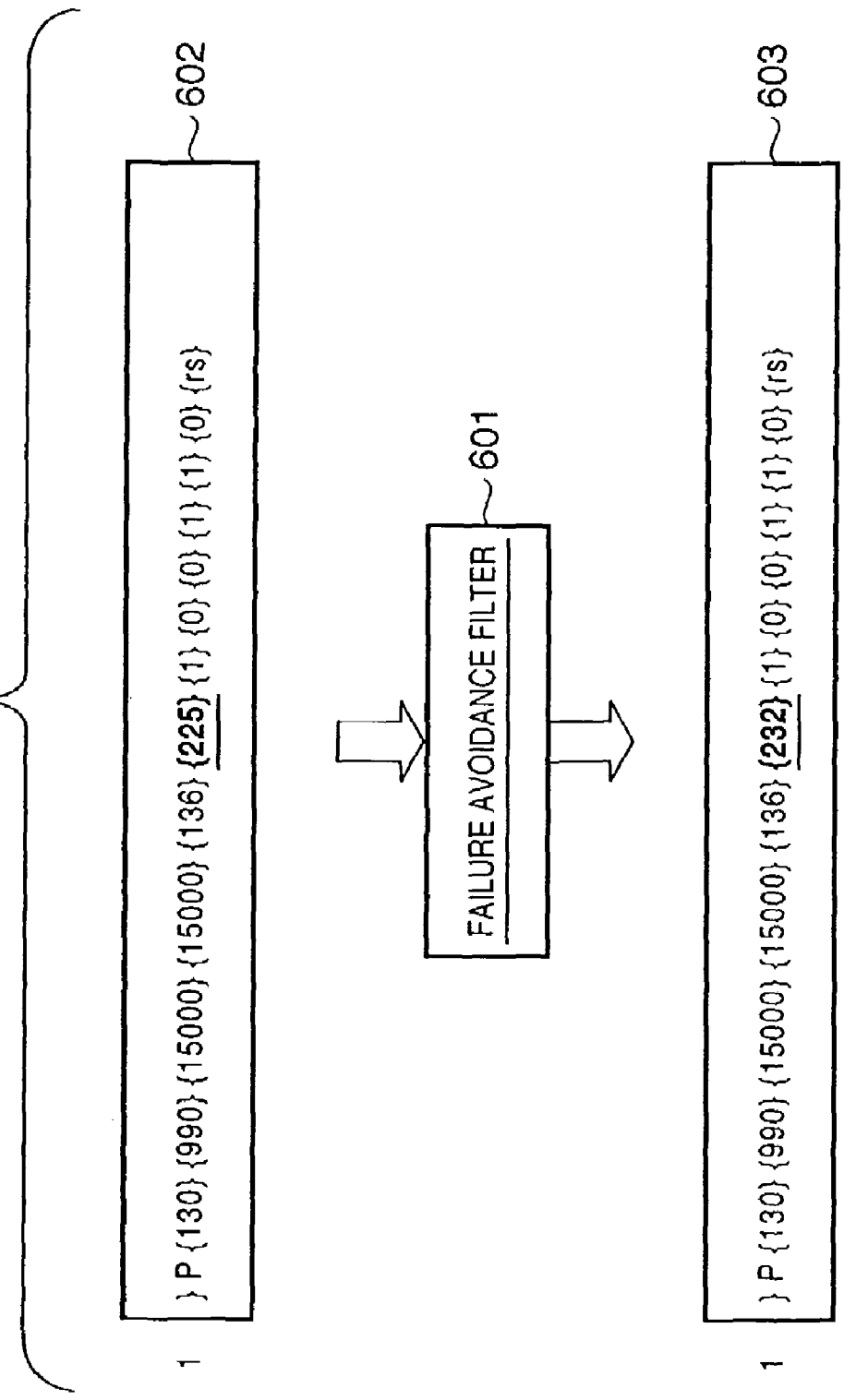
FIG. 6 is a diagram for illustrating a process performed by a failure avoidance filter, which is another exemplary filter module in the embodiment.

FIG. 6 is a diagram for explaining a process performed by a failure avoidance filter module, which is an exemplary filter module in the present embodiment. The failure avoidance filter module 601 is an example of components corresponding to filter processing units, 1201, 1301, and 1401. In the foregoing example, a data stream pattern matching and replacement technique by a filter is used in order to solve the compatibility problem due to a difference in interpretation of specifications between printers. The same technique can be used for urgently avoiding a failure (such as a bug in firmware) in a printer implementation. Assume that a bug in a released version of a printer that causes incorrect drawing if the width of an image specified in "Video Display Metafile (VDM)" in LIPS (registered trademark) is not a multiple of 8. Even if data streams of this pattern are outputted only in a certain use of a particular application, or if the bug is of a type that should be corrected in a core portion, such as a translator or a renderer, of a LIPS (registered trademark) language processing system, a failure in a real customer environment caused by the bug must be quickly addressed.

The failure avoidance filter module 601 detects a failure-causing pattern in a LIPS (registered trademark) data stream containing data indicated by reference numeral 602 (a pattern in which the width of a VDM image is not a multiple of 8, that is, "225" in the example in FIG. 6). Then, the failure avoidance filter module 601 replaces it with data 603 (a VDM-image-data-width of "232", which is a multiple of 8 and greater than 225), which does not elicit the failure and functions equivalently.

Figure 7:
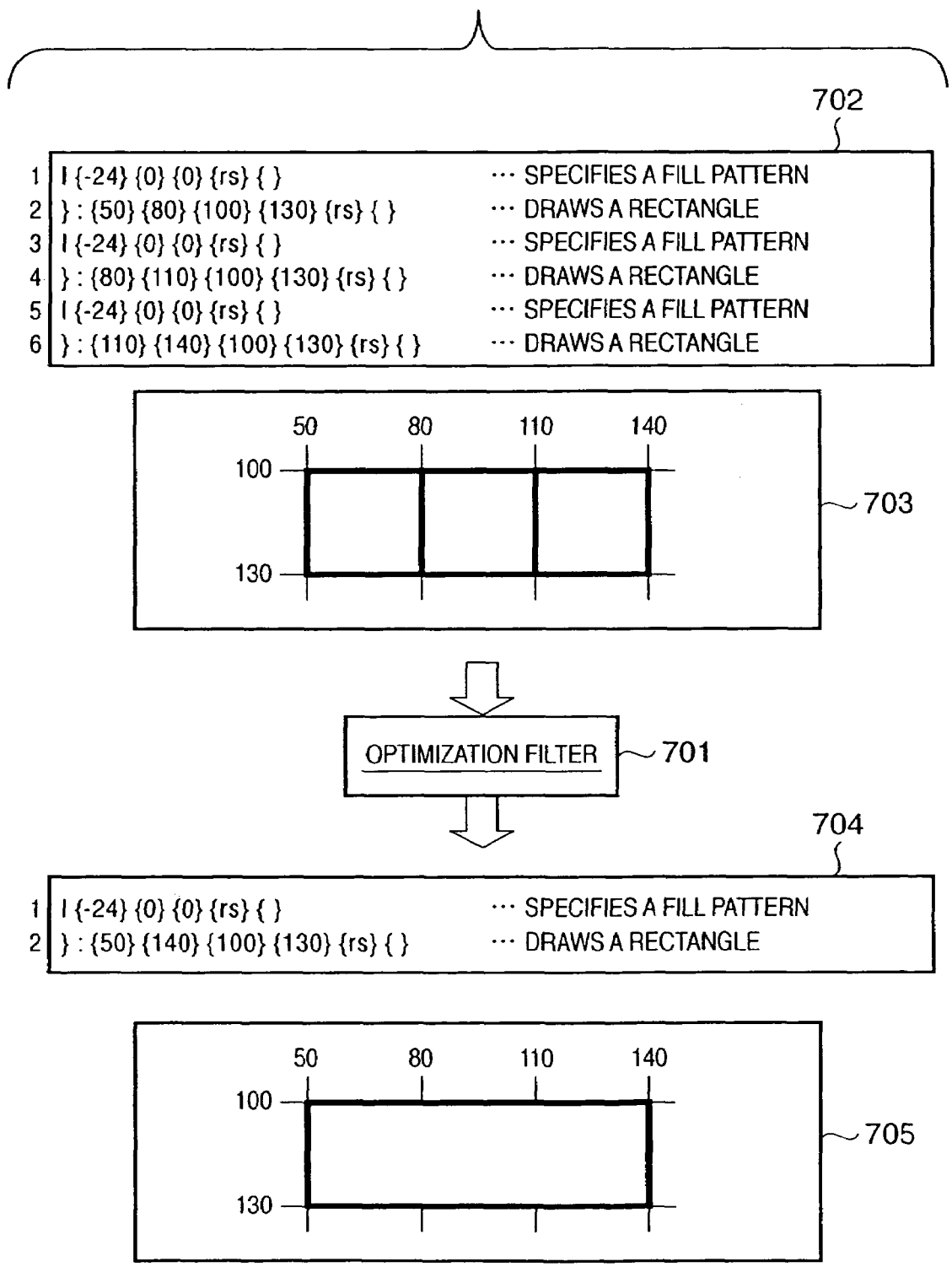
FIG. 7 is a diagram for illustrating a process performed by an optimization filter, which is another exemplary filter module in the embodiment.

FIG. 7 is a diagram for explaining a process performed by an optimization filter module, which is another exemplary filter module in the present embodiment. The optimization filter module 701 reads an input data stream, detects redundantly written PDL data in the data stream, converts it into more efficient data having an identical function, and writes it in an output stream. A PDL data stream generated by a printer driver tends to contain redundant processing patterns such as repetitions due to requirements in a client print requesting system or application. The optimization filter module 701 recognizes such a redundant description pattern as a sort of "idiom" and replaces it with an equivalent, high-efficiency description.

Part 702 shows an example of a data stream inputted into the optimization filter module 701. In the data stream 702, a description is repeated for filling three squares in order to fill a horizontal rectangle as shown in part 703. Part 704 shows an exemplary output data stream from the optimization filter module 701. It can be seen that the redundant, repeating patterns (703) contained in the data stream 702 have been detected and replaced with a single description for filling one equivalent horizontal rectangle as shown in 705 by the optimization filter module 701.

A process for setting up filter modules according to the present embodiment will be described below in detail.

Figure 8A:
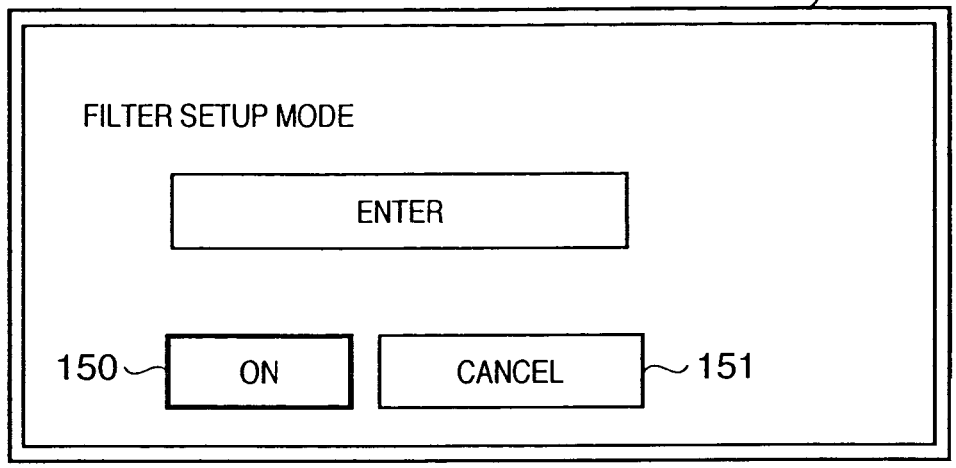
FIGS. 8A to 8C show an exemplary user interface for filter setup process according to the first embodiment.
Figure 8B:
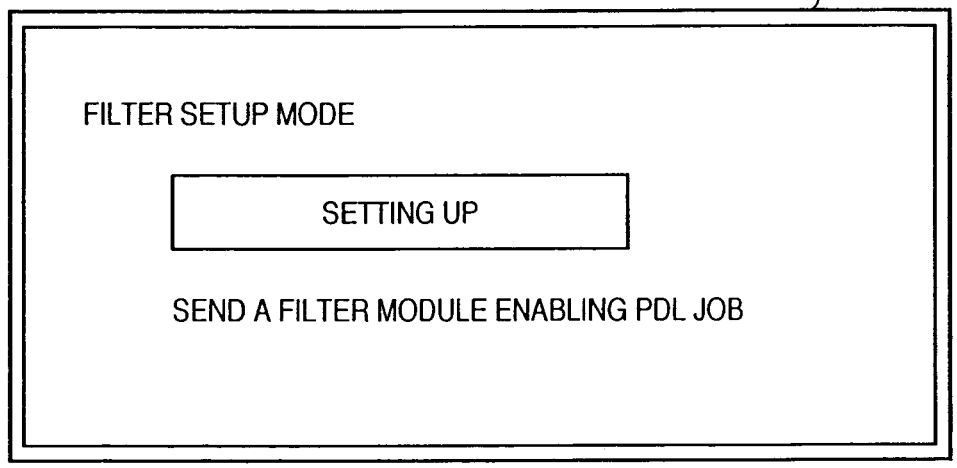
Figure 8C:
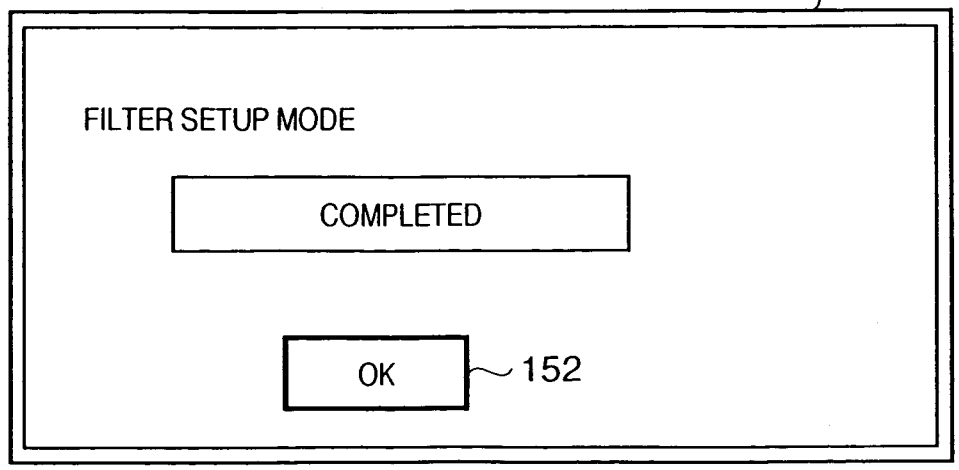

FIGS. 8A to 8C shows operations in a filter-setup process. In the filter-setup process according to the present embodiment, a filter module enabling PDL job 450 is transferred from a host computer 200 to a printer 100 to selectively enable filter modules in a filter unit 105 of the printer 100. Operations in the filter-setup process are performed on an operation panel 103 of the printer 100 by an operator.

FIG. 8A shows a state in which an interface for prompting the operator to turn on filter-setup mode is displayed. The operator wants to set up filters and therefore selects the ON button 150. If the operator wanted to abort the filter-setup for some reason, the operator would select the Cancel button 151. When the ON button 150 is pressed, a screen as shown in FIG. 8B appears, where a message for prompting the operator to send a filter module enabling PDL job is displayed. At this stage, the operator transfers a filter module enabling PDL job from the host computer 200 shown in FIG. 4 to the printer 100.

After the printer 100 receives the filter module enabling PDL job and filters of the printer is selectively enabled, a screen as shown in FIG. 8C appears on the operation panel 103. On the screen shown in FIG. 8C, an indication of the completion of filter-setup is displayed to prompt the operator to confirm exiting the filter-setup mode. When the operator selects the OK button 152, the filter-setup process will end.

As a result of the operation, filters 1200, 1300, 1400 of the printer 100 are selectively enabled according to the filter module enabling PDL job.

An internal process performed inside the printer 100 during the process described above will be detailed with reference to FIGS. 9 to 13.

Figure 9:
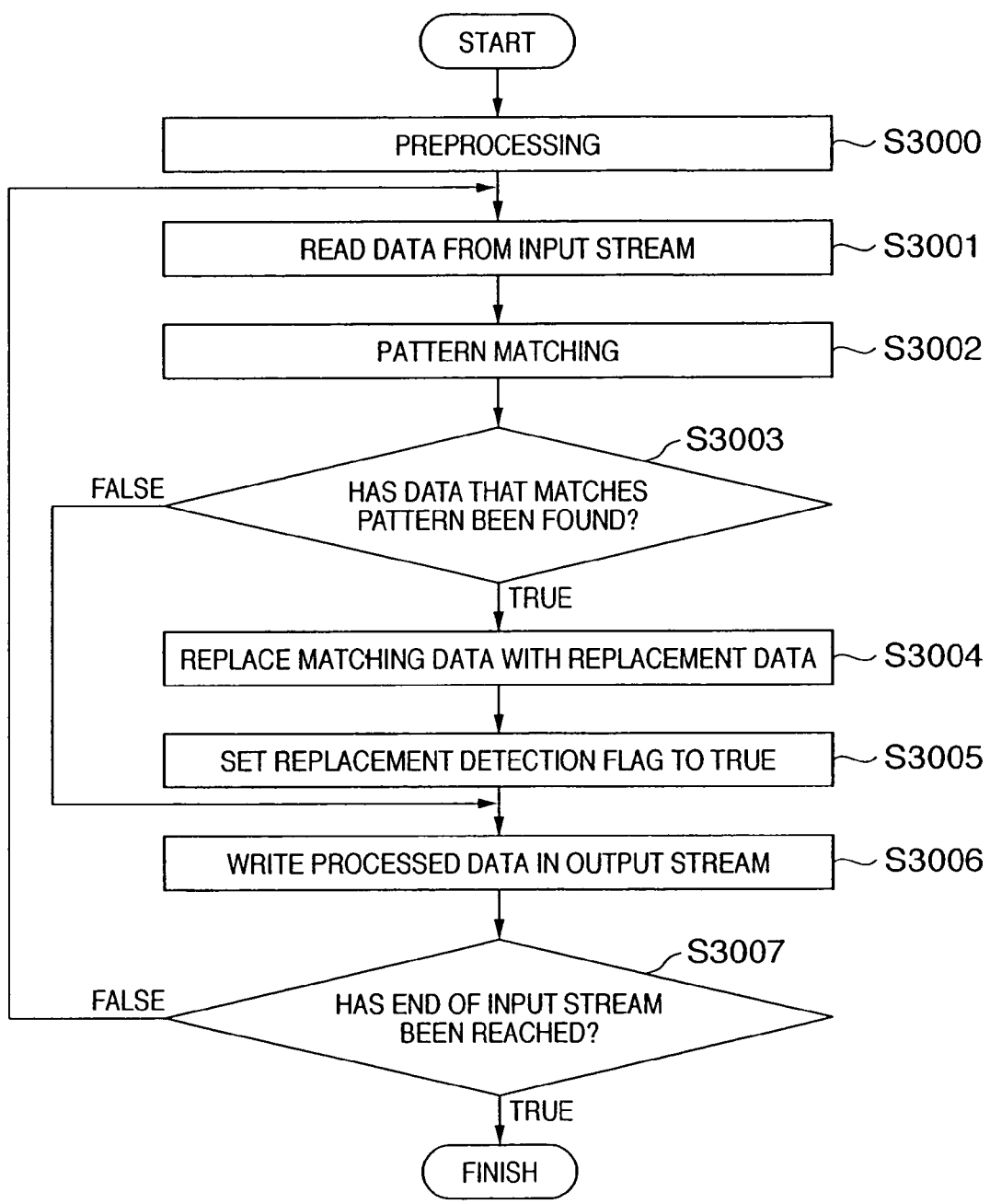
FIG. 9 is a flowchart of filter processing according to the embodiment.

FIG. 9 is a flowchart showing main operations performed by a filter processing unit. The flowchart illustrates an internal process in a filter 1200, 1300, 1400 in the filter unit 105 (a process performed by the filter processing unit). The filters performs the same process, except for their specific filtering operations (replacement operation at steps S3002 to S3004).

In the filtering process, a PDL job is inputted as an input stream, pattern matching is performed sequentially, and matching portions in the data are replaced in a predetermined way and outputted in an output stream. According to the present embodiment, if a replacement has been made in the filter processing unit, a replacement detection flag associated with the filter processing unit is set to "true". Setting replacement detection flag to "true" in this way can indicate that the filter should be enabled. A filter module enabling/disabling process according to the present embodiment will be described below with reference to the flowcharts in FIGS. 9 and 10.

Operations of the filter unit 105 during printing will be described first with reference to FIG. 9. At step S3000, required preprocessing is performed. The preprocessing includes initialization of attributes used internally by the filter and preprocessing of a pattern description used for pattern matching. At step S3001, an amount of data required for pattern matching is read from the input stream. At step S3002, pattern matching is performed to find an occurrence of a data pattern to be manipulated by the filter in the input data stream. The data pattern to be manipulated by the filter may be a fixed data string itself or a description in a formal language, such as regular expression. There are various widely-known implementations for finding an occurrence of data in a data stream that matches a pattern description (grep, set, AWK, and Perl are well known).

At step S3003, determination is made as to whether or not matching data is found as a result of the pattern matching. If data that matches the pattern description is found in the data stream, the process proceeds to step S3004; otherwise, the process proceeds to step S3006. At step S3004, an operation depending on the purpose of the filter is performed on the partial data stream in the data stream that matches the pattern description and the partial data stream is replaced with the data resulting from the operation.

At step S3005, the replacement detection flag is set to "true". At step S3006, the processed data streams (data streams that do not contain the monitored pattern or partial data streams resulting from the operation at step S3004 applied to partial data stream that contain the monitored pattern) are written in an output stream. At step S3007, determination is made as to whether or not the end of the input stream has been reached. If the end has been reached, the process will end; otherwise, the process returns to step S3001 and the process described above will be repeated.

Figure 10:
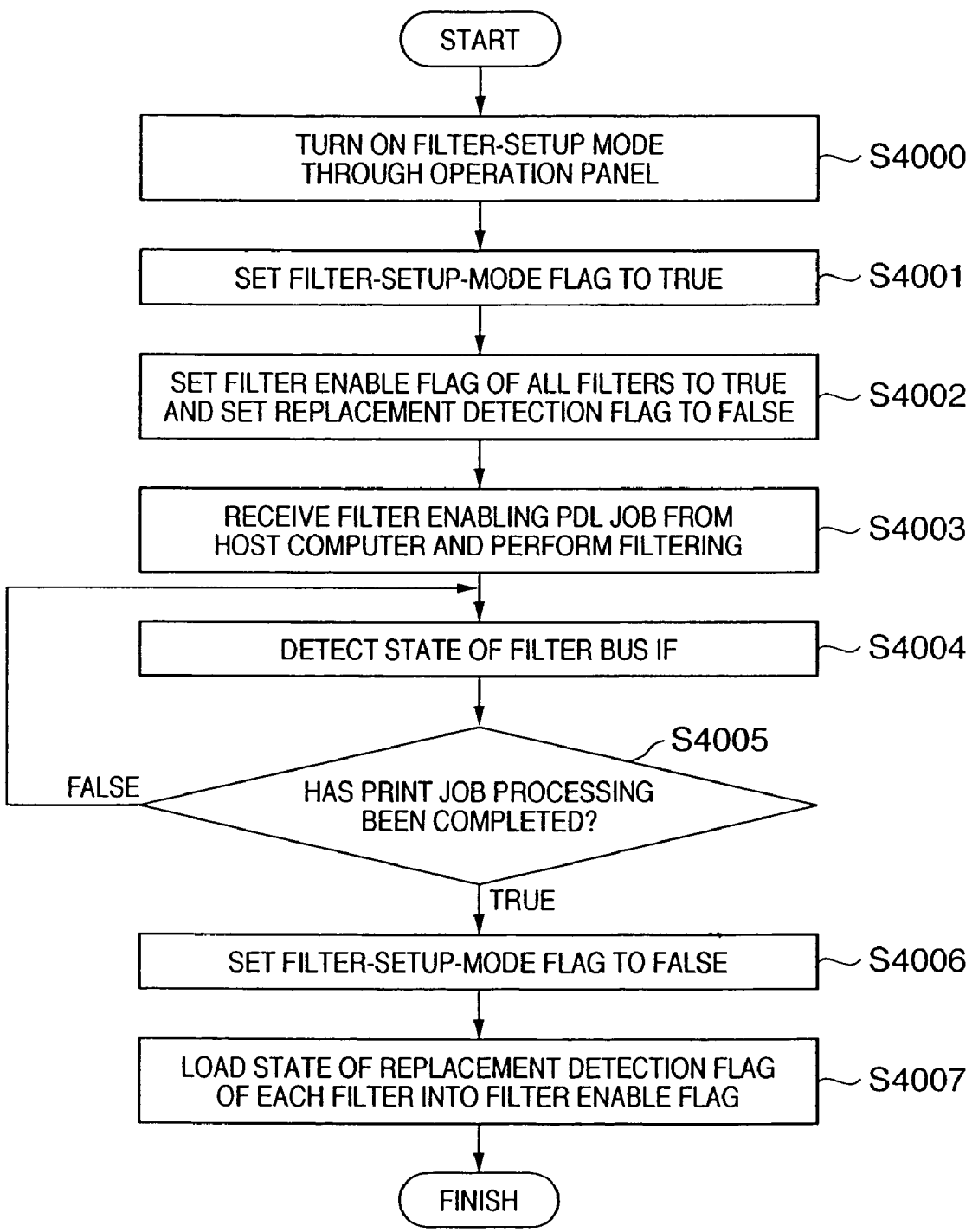
FIG. 10 is a flowchart of a filter-setup-mode process according to the first embodiment.

FIG. 10 is a flowchart in filter-setup mode. With reference to the flowchart, an internal process in the printer 100 during the operator process described with reference to FIG. 8 will be described. In the following, a process in which the operator turns on filter-setup mode to transfer a filter module enabling PDL job 450 to the printer 100 and the filter unit 105 selectively enables filters for which a filtering unit has performed data replacement in response to the PDL job 450. The process is performed in the control unit 102 and the filter unit 105.

When an operator turns on the filter-setup mode through a panel operation shown in FIG. 8A at step S4000, the process proceeds from step S4000 to step S4001. At step S4001, a filter-setup-mode flag 110 is changed from false to true. This causes the filter unit 105 to enter filter-setup mode. In response to the change of the filter-setup-mode flag from false to true, the filter enable flags 1202, 1302, 1402 of all filters 1200, 1300, and 1400 in the filter unit 105 are set to true at step S4002. Furthermore, the replacement detection flags 1203, 1303, and 1403 are set to false. In other words, when the filter-setup mode is selected, the filter enable flags of all filter modules are forced to be set to true, the filters are forced to be enabled, and the replacement detection flags of all filter modules are forced to be set to false. At this point of time, the display on the operation panel 102 shown in FIG. 8A changes to the display as shown in FIG. 8B.

At step S4003, a filter module enabling PDL job 450 is received from the host computer and filtering is performed. While the filter module enabling PDL job 450 is performed, each filter operates as described with reference to FIG. 9 and the replacement detection flag of a filter that has actually acted (a filter that has actually replaced data) is set to true. Printing need not be performed during processing of the filter module enabling PDL job.

At step S4004, the output state of the filter bus interface 1000 is detected. In particular, it is detected that all data subjected to filtering have been outputted from the last filter 1400 in the PDL job. At step S4005, determination is made as to whether the filtering in the PDL job has been completed. If so, the process proceeds to step S4006; otherwise the process returns to step S4004 and the determination as to whether the filtering has been completed is repeated.

At step S4006, the filter-setup-mode flag 1100 is set to false. In response to this, the states of the replacement detection flags 1203, 1303, and 1404 of all filters 1200, 1300, and 1400 are loaded to the filter enable flags 1202, 1302, and 1402, respectively. As a result, the enable flag of a filter module that has actually acted during processing of the filter module enabling PDL job 450 is set and the filter module is set up.

Changes of the states of flags in the filter setup mode process described above will be described with reference to FIGS. 11 to 13.

Figure 11:
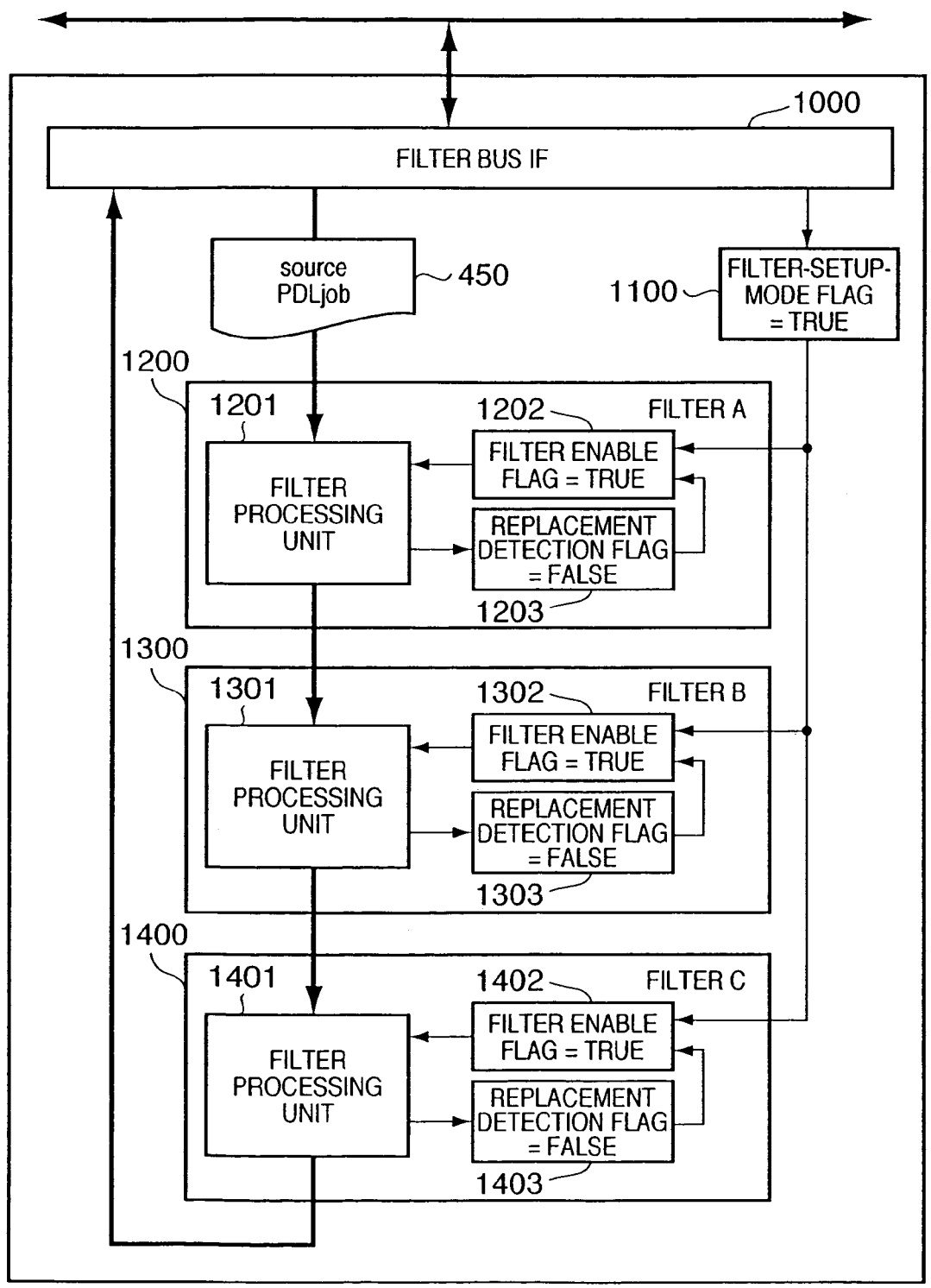
FIG. 11 shows the status of flags when the filter-setup mode is in the ON sate.

FIG. 11 shows the states of the flag after the filter-setup mode is turned on. That is, FIG. 11 shows the states of flags in step S4002 of the flowchart shown in FIG. 10 (the states before the filter module enabling PDL job 450 is provided). After the filter-setup-mode flag 1100 change from false to true, the filter enable flags 1202, 1302, and 1402 of all filters are set to true as shown in FIG. 11. Furthermore, the replacement detection flags 1203, 1303, and 1403 of all filters are forced to be set to false. In this state, the filter module enabling PDL job 450 is transferred from the host computer and inputted to the filter processing unit 1201 of the firs filter 1200 through the filter bus interface 1000 (step S4003).

Figure 12:
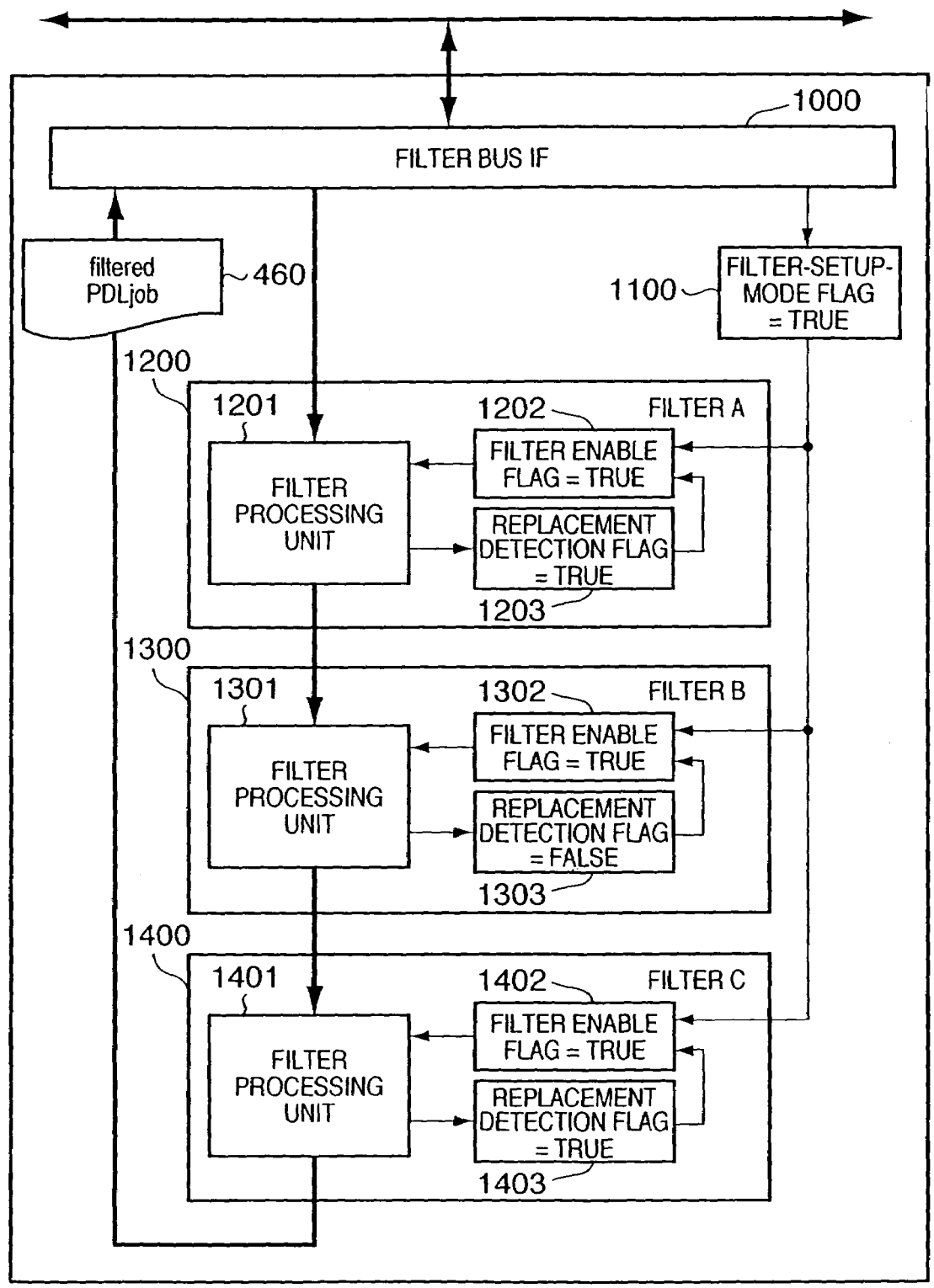
FIG. 12 shows the status of the flags immediately after a filter enabling PDL job is completed in all filters.

FIG. 12 shows the states of the flags after the filter module enabling PDL job 450 is performed in all filters. It is assumed that filter module enabling PDL job 450 used in this example is a PDL job that enables the filters 1200 and 1400. Accordingly, when the filter module enabling PDL job 450 is performed in the filter 1200, data is replaced and the replacement detection flag 1203 is set to true. Even though the filter module enabling PDL job 450 is provided to the filter 1300, data replacement is not performed and therefore the replacement detection flag 1303 remains false. The filter module enabling PDL job 450 is performed in the filter 1400, data is replaced and the replacement detection flag 1403 is set to true.

After the completion of the above process, the PDL job 460 in which data replacement is made through filtering is sent to the translator 106 in the next state through the filter bus interface 1000.

Figure 13:
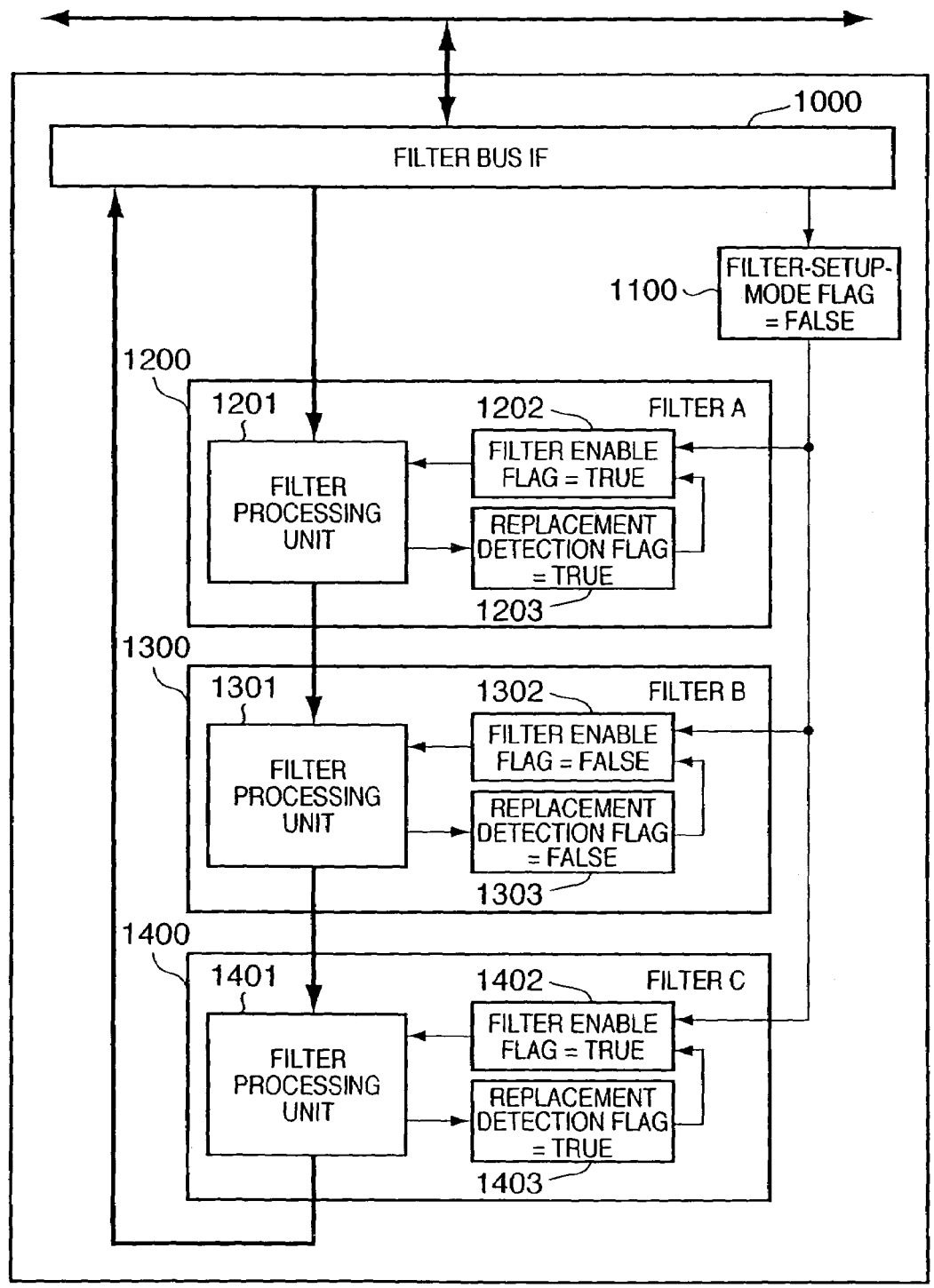
FIG. 13 shows the status of the flags after the completion of filter-setup mode.

FIG. 13 shows the states of the flags after the filter setup mode described with reference to FIGS. 11 and 12 has ended. FIG. 13 shows the states of flags in step S4007 of the flowchart shown in FIG. 10. In particular, in response to the change of the filter-setup-mode flags 1100 from true to false, the states of the replacement detection flags 1203, 1303, and 1403 of all filters 1200, 1300, and 1400 are loaded into the filter enable flags 1202, 1302, and 1402, respectively. In this example, the filter enable flags 1202 and 1402 are set to true and the filter enable flag 1302 is set to false, as has been described with respect to FIG. 12. Accordingly, the filters 1200 and 1400 are enabled and the filter 1300 are disabled.

In the subsequent jobs, only the filters 1200 and 1400 are enabled and PDL translation is performed.

According to the first embodiment described above, a processing mode called the filter setup mode is provided. In the filter setup mode, after a given PDL job is processed, it is detected whether each of the available filter modules has made replacements. Then, only the filter modules that have made replacements are enabled and set up. Thus, setup tasks which have been performed manually by a human operator on a per-filter-module in the past can be eliminated and filter modules can be set up and enabled by considerably simple operations. That is, filter module can be set up and enabled in a considerably simple manner compared with conventional complex tasks for setting up to enable filter modules by an operator performing operations on a operation panel or a remote user interface through a network. Particularly, printer service personnel can set up filter modules by using filter module enabling PDL jobs provided by the printer development department. This can relieve the burdens on the service department in customizing enablement of filter modules to suite individual user environment.

Second Embodiment

In the first embodiment, filter setup is completed by setting the filter-setup-mode flag to false once a single filter module enabling PDL job has been processed. However, filters may be set up explicitly by an operator through the operation panel. This allows multiple PDL jobs to be used to set up filters. This arrangement is intended to be used for offering a certain trial use period to a general user, in order that the user can set up (enable or disable) filters from ordinary print data. The second embodiment will be descried below.

Figure 14:
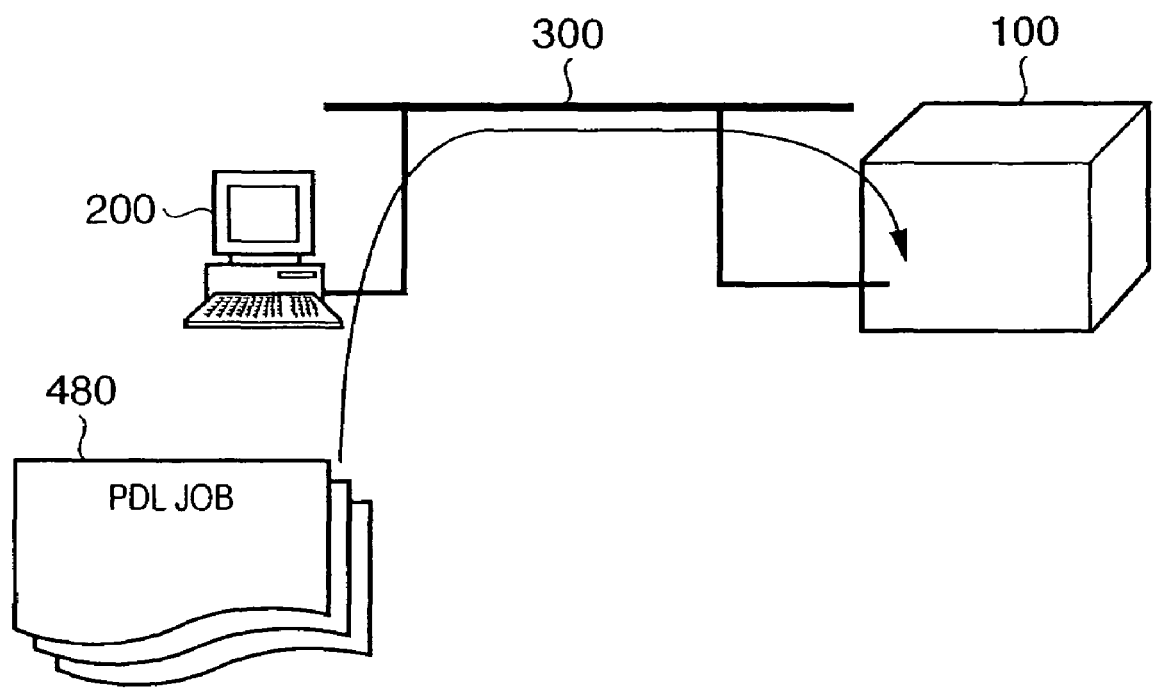
FIG. 14 is a diagram for illustrating a filter setup concept according to a second embodiment.

FIG. 14 shows an outline of a filter setup process according to the second embodiment. FIG. 14 shows how an ordinary PDL job 480 is sent more than once from a host computer 200 to a printer 100 through a computer network 300. Filters that have made data replacements in the PDL job transferred to the printer 100 in a given period of time will be enabled. In the first embodiment, a printer service person selectively enables filters by using a filter module enabling PDL job 450 provided by the development department. In contrast, the second embodiment is intended to be used for providing a certain trial use period which a user can use filter setup mode. Filters that have made data replacements during the trial use period are kept enabled until the next filter setup.

One of the features of the second embodiment, like the first embodiment, is that a PDL job itself is used to enable filter modules, rather than defining a special command for enabling filters individually.

FIG. 15 shows operations in a filter setup process according to the second embodiment. Unlike the operations described with respect to FIG. 8 in the first embodiment, operations for staring and ending the filter setup mode are performed by an operation on the operation panel 103 of the printer 100. However, the filter setup mode may be automatically exited by referring to an internal calendar to detect a lapse of predetermined time since the filter setup mode was entered.

Figure 15A:
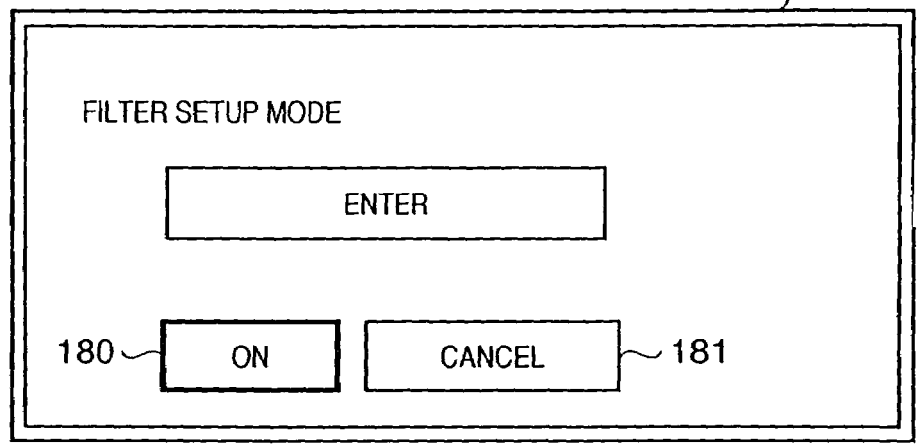
FIGS. 15A to 15C show an exemplary user interface for filter setup process according to the second embodiment.
Figure 15B:
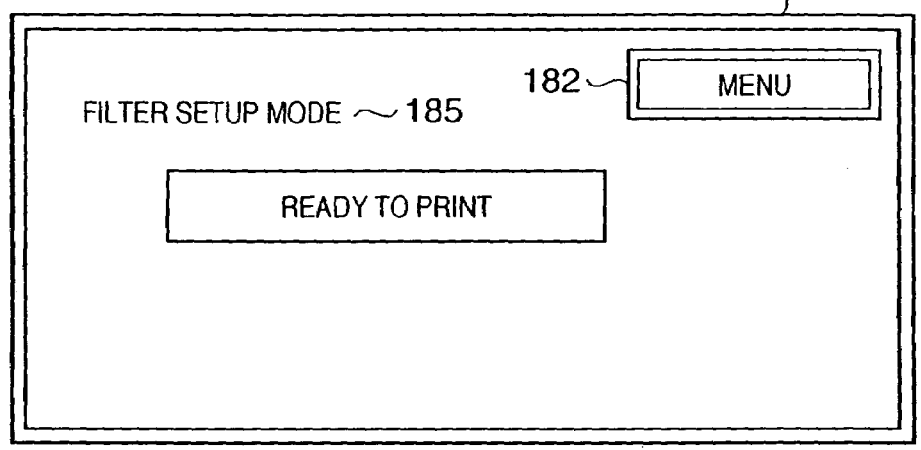

FIG. 15A shows a display on the operation panel 103 that prompts the operator to turn on the filter setup mode. The operator selects the ON button 180 in order to set up filters. If the operator wanted to cancel the filter setup for some reason, the operator would select the Cancel button 181. Then, a display as shown in FIG. 15B appears in which a message indicating that the printer is ready to print, which is the normal state of the printer. Because the filter setup mode is turned on, an indication of the on state is displayed at the top left corner of the screen (185). This indicates that the printer in the trial filter-setup-mode period.

Figure 15C:
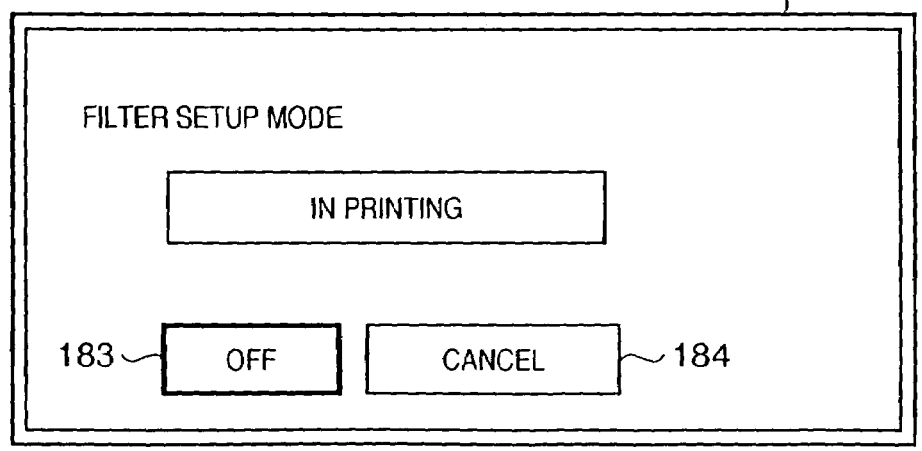

In this state, user can perform normal printing. To end the trial use period, the operator selects a menu button 182 to invoke a filter-setup-mode menu. Then, a display as shown in FIG. 15C appears. FIG. 15C shows that the printer is in the filter setup mode. If the operator wants to end the filter setup mode, the operator presses selects the OFF button 183; if the operator wants to continue the filter setup mode, the operator selects the Cancel button 184.

The operation enables only those filters that have operated (replaced data) during the trial, among the filters 1200, 1300, and 1400 provided in the filter unit 105 of the printer 100.

Figure 16:
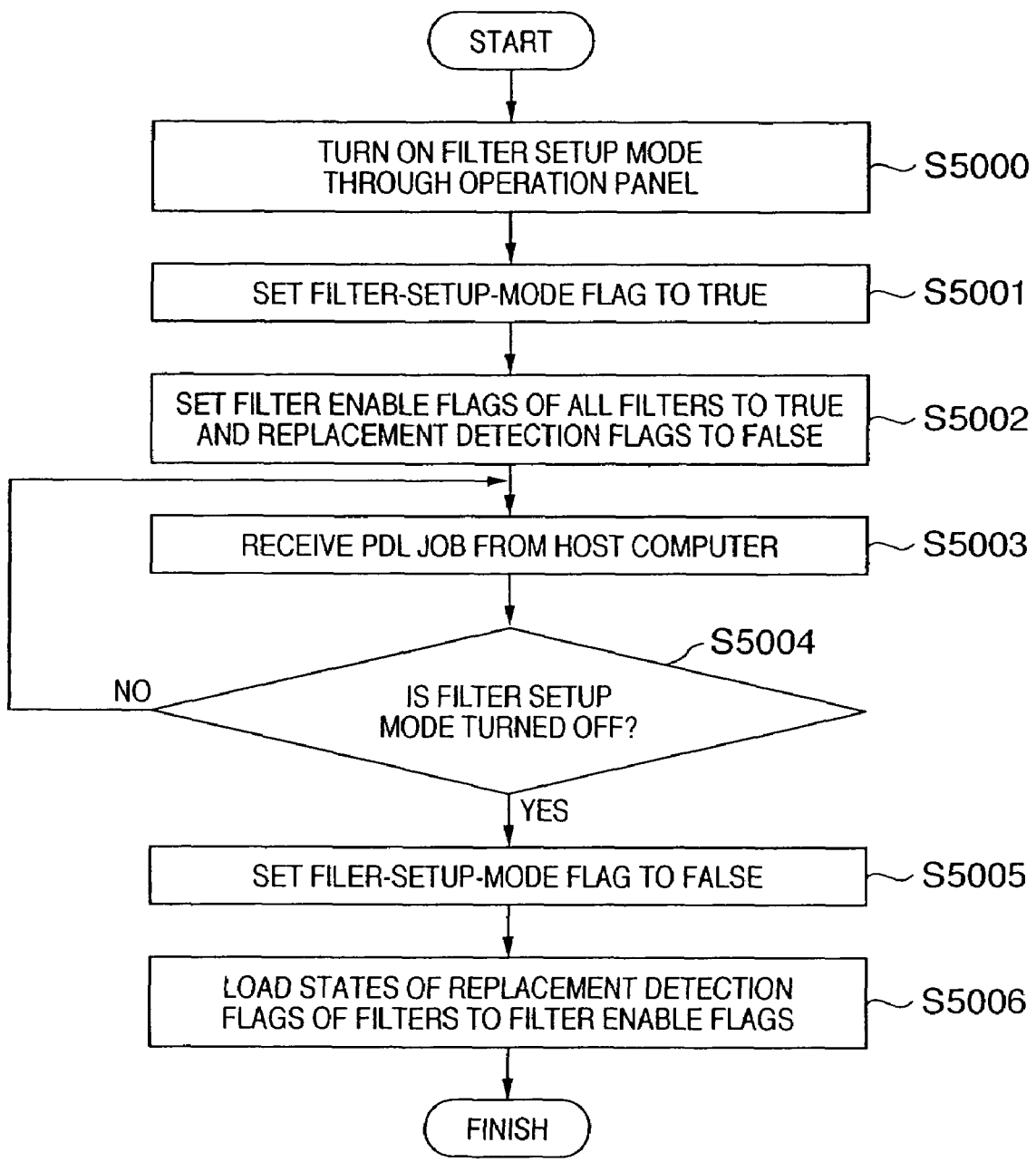
FIG. 16 is a flowchart of a filter-setup-mode process according to the second embodiment.

FIG. 16 is a flowchart of a filter setup mode process according to the second embodiment. With reference to the flowchart in FIG. 16, an internal process performed inside the printer 100 during the operator operation described with respect to FIG. 15 will be described. That is, the following is the description of a process for enabling only the filters that have made data replacement in a PDL job sent from the user after the filter setup mode is turned on by the operator during the trial use period. The process is performed in the control unit 102 and the filter unit 105.

When the operator operates the panel shown in FIG. 15A to turn on the filter setup mode, the process proceeds from step S5000 to step S5001. At step S5001, the filter-setup-mode flag 1100 is changed from false to true. This causes the filter unit 105 to enter the filter setup mode state. In response to the change of the filter-setup-mode flag 110 from false to true, the filter enable flags 1202, 1302, and 1402 of all filters 1200, 1300, and 1400 are set to true at step S5002, and the replacement detection flags 1203, 1303, and 1403 of all filters 1200, 1300, and 1400 are set to false. That is, when the filter setup mode is selected, the filter enable flags of all filters are forced to be set to true to enable the filters, and the replacement detection flags of all filters are forced to be set to false. At this point of time, the display on the operation panel 103 shown in FIG. 15A changes to the display shown in FIG. 15B.

At step S5003, a PDL job is received from the host computer 200 and is processed. Each filter performs the process shown in FIG. 9 and the replacement detection flags of filters that have actually replaced data are set to true. Reception and processing of PDL jobs at step S5003 are performed until the filter setup mode is turned off (step S5004). That is, whenever a PDL job is received during the trial use period, the PDL job is performed.

When the operator performs a panel operation shown in FIG. 15C to turn off the filter setup mode, the process proceeds to step S5005, where the filter-setup-mode flag 1100 is changed from true to false. In response to this, the states of the replacement detection flags 1203, 1303, and 1403 of all filters 1200, 1300, and 1400 are loaded into the filter enable flags 1202, 1302, and 1402, respectively. Thus, the filters have been set up.

The second embodiment described above has an advantage as described below. It has been assumed in the first embodiment that filters specified by a printer service person are selectively enabled by using a filter module enabling PDL job provided from the development department. In the second embodiment, a trial period is provided in which a user can use the filter setup mode and filters that have replaced data in the trial use period are enabled permanently. Therefore, filter modules that will be actually used in the printing environment in which the printer is installed can be selectively enabled. Accordingly, the user can enable (customize) appropriate filter modules without needing detailed knowledge about the filter modules.

According to the embodiments described above, an image processing apparatus has a processing mode called the filter setup mode. In the filter setup mode, whether each of available filters has performed filtering (data replacement) in performing a PDL job is detected and the filters that have performed filtering are enabled. Thus, filters can be enabled with considerably simple operations without needing manual setup tasks by a human operator. That is, filters can be enabled in a considerably simple manner compared with conventional complex tasks in which the operator performs operations on an operation panel or a remote user interface through a network.

Because the contents of replacement detection flags are loaded when exiting the filter setup mode in the embodiments described above, only the filters that have performed processing during the filter setup mode are enabled. However, a user may want to keep enabled filters enabled regardless of the result of processing in the filter setup mode. Therefore, filters that have been in the enabled state before the filter setup mode is entered may optionally be kept enabled. This can be accomplished in the following manner, for example. Instead of setting the replacement detection flags to false when starting the filter setup mode, the states of the enable flags are loaded into the replacement detection flags before starting the filter setup mode (S4002, S5002). When exiting the filter setup mode, the states of the replacement detection flags are loaded into the enabled flags. In this way, the enabled state before starting the filer setup mode can be maintained.

Other Embodiments

The present invention can also be applied to, in addition to the embodiment of the present invention described above, another embodiment for delivering deficiency correction filters, that is, a case where patch filters for correcting a deficiency of filters customized to suite a user are delivered. Correction of deficiency of a customized filter to suite a user is applied only to that user's customized filter. According to the present invention, patch filter A for user a and patch filer B for user b can be delivered as a single executable program stored in a medium such as a CD-ROM, for example. In this way, deficiency correction filters can be applied with little concern for customization.

It should be noted that the present invention includes an implementation in which a software program that implements the functions of the embodiments described above (a program equivalent to the flowcharts shown in the drawings) is provided directly or remotely to a system or an apparatus and the program code provided is read and executed by the computer of the system or the apparatus to implement the functions.

Therefore, the program code installed in a computer in order to implement the functions and processing of the present invention on the computer also implements the present invention. In other words, the present invention includes the computer program itself that implements the functions and processing of the present invention.

The program may be any program which has the functions, such as a program implemented as an object code or an interpreter, or script data to be provided to an OS.

The recording media for providing the program include a computer-readable medium, such as a floppy disk, a hard disk, an optical disk, a magneto-optical disk (MO), a CD-ROM, a CD-R, a CD-RW, a magnetic tape, a non-volatile memory card, a ROM, and a DVD (DVD-ROM and DVD-R).

The program may also be provided to a client computer by connecting to a Web page on the Internet through a browser of the client computer and downloading the computer program of the present invention or its compressed file including an automatic install function from the Web page to a recording medium such as a hard disk of the computer. Furthermore, the program code constituting the program of the present invention may be divided into files. The files may be downloaded from different Web pages. In other words, the present invention also includes a WWW server from which a number of users can download the program file that implements the functions and processing of the present invention on computers.

Another implementation is possible in which the program of the present invention is encrypted, stored on a storage medium such as a CD-ROM, and users who meet predetermined requirements are allowed to download key information for decrypting the program from a Web page through the Internet, then the users can use the key information to install and execute the encrypted program in the computer.

The functions of the embodiments described above can be implemented by a computer reading and executing the program. The functions of the embodiments described above can also be implemented by processing by an OS running on the computer which performs part or all of actual processing of the embodiments.

In addition, the functions of the embodiments described above can also be implemented, after the program read out from the recording medium is written on a memory provided on a function extension board inserted in the computer or a function extension unit connected to the computer, by processing by a CPU provided on the function extension board or the function extension unit, which performs part or all of actual processing of the embodiments based on the instruction of the program.

According to the present invention, processing modules can be enabled by considerably simple operations without needing setup tasks for manually enabling the processing modules individually.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application No. 2004-231431 filed on Aug. 6, 2004, which is hereby incorporated by reference herein.

What is claimed is:

1. An image processing apparatus comprising:
a central processing unit;
a memory unit coupled to the central processing unit;
a plurality of filter processing modules stored in the memory unit each of which causes the central processing unit to apply a process to predetermined data in input print data;
a detecting unit configured to cause the central processing unit to detect a filter processing module that previously has performed processing of the input print data in a predetermined mode; and
a setting unit configured to cause the central processing unit to make a setting that enables the filter processing module detected by the detecting unit, after the predetermined mode ends.

2. The image processing apparatus according to claim 1, wherein the print data inputted in the predetermined mode is print data inputted subsequently to a setup-mode start instruction.

3. The image processing apparatus according to claim 1, wherein the print data inputted in the predetermined mode is print data inputted between a setup-mode start instruction and a setup-mode end instruction.

4. The image processing apparatus according to claim 1, wherein print data inputted in the predetermined mode is print data inputted after a setup-mode start instruction.

5. The image processing apparatus according to claim 1, wherein the process performed by the each of the plurality of filter processing modules includes a process for detecting a particular data pattern appearing in print data and replacing a data portion in which the data pattern is detected with new data.

6. The image processing apparatus according to claim 1, wherein the setting unit makes a setting that enables only the filter processing module detected by the detecting unit after the predetermined mode ends.

7. The image processing apparatus according to claim 1, wherein the setting unit makes a setting that, after the predetermined mode ends, enables the filter processing module detected by the detecting unit and a filter processing module that has been enabled before the predetermined mode starts.

8. The image processing apparatus according to claim 1, wherein a filter processing module of the plurality of filter processing module allows the inputted print data to pass through intactly if the filter processing module is not enabled by the setting unit.

9. An image processing apparatus comprising:
a central processing unit;
a memory unit coupled to the central processing unit;
a plurality of filter processing modules stored in the memory unit each of which causes the central processing unit to apply to input print data a process for detecting and replacing predetermined data in the input print data, wherein each of the plurality of filter processing modules causes the central processing unit to perform a process, if an enable flag of the filter processing module is in an on state, and, if the filter processing module has caused the central processing unit to replace data, the filter processing module causes the central processing unit to set an execution flag of the filter processing module to an on state; and
a control unit configured to cause the central processing unit to set enable flags of all of the plurality of filter processing modules to the on state at a start of a predetermined mode, to provide print data to the plurality of filter processing modules, and to maintain the on state of only each enable flag of each filter processing module whose execution flag is in the on state after the predetermined mode ends.

10. A method for controlling operation of an image processing apparatus including a central processing unit, a memory unit coupled to the central processing unit, and a plurality of filter processing modules stored in the memory unit each of which causes the central processing unit to apply a process to predetermined data in inputted print data, comprising:
a detecting step of detecting, by the processor, a filter processing module that previously has performed processing of the input print data in a predetermined mode; and
a setting step of making a setting, by the processor, that enables the filter processing module detected in the detecting step, after the predetermined mode ends.

11. A method for controlling operation of an image processing apparatus including a central processing unit, a memory unit coupled to the central processing unit, and a plurality of filter processing modules stored in the memory unit each of which causes the central processing unit to apply to input print data a process for detecting and replacing predetermined data in the input print data, wherein each of the plurality of filter processing modules performs a process, if an enable flag of the filter processing module is in an on state, and, if the filter processing module has replaced data, an execution flag of the filter processing module is set to an on state, the method comprising:
a first step of turning on, by the processor, enable flags of all the plurality of filter processing modules at a start of a predetermined mode and providing print data to the plurality of filter processing modules; and
a second step of maintaining, by the processor, the on state of only each enable flag of each filter processing module whose execution flag is in the on state after the predetermined mode ends.

12. A data processing apparatus comprising:
a central processing unit;
a memory unit coupled to the central processing unit;
a plurality of filter processing modules stored in the memory unit each of which causes the central processing unit to apply a process to predetermined data in input data;

a detecting unit configured to cause the central processing unit to detect a filter processing module that previously has performed processing of the inputted input data in a predetermined mode; and a setting unit configured to cause the central processing unit to make a setting that enables a filter processing module detected by the detecting unit, after the predetermined mode ends.

13. The data processing apparatus according to claim 12, wherein the data inputted in the predetermined mode is data inputted subsequently to a setup-mode start instruction.

14. The data processing apparatus according to claim 12, wherein the data inputted in the predetermined mode is data inputted between a setup-mode start instruction and a setup-mode termination instruction.

15. The data processing apparatus according to claim 12, wherein the data inputted in the predetermined mode is data inputted after a setup-mode start instruction.

16. The data processing apparatus according to claim 12, wherein each of the plurality of filter processing modules includes a process for detecting a particular data pattern appearing in data and replacing a data portion in which the data pattern is detected with new data.

17. The data processing apparatus according to claim 12, wherein the setting unit makes a setting that enables only the filter processing module detected by the detecting unit after the predetermined mode.

18. The data processing apparatus according to claim 12, wherein the setting unit makes a setting that, after the predetermined mode ends, enables the filter processing module detected by the detecting unit and a filter processing module that was enabled before a start of the predetermined mode.

19. The data processing apparatus according to claim 12, wherein each filter processing module of the plurality of processing modules allows the inputted print data to pass through intactly if the filter processing module is not enabled by the setting unit.

20. A data processing apparatus comprising:
a central processing unit;
a memory unit coupled to the central processing unit;
a plurality of filter processing modules stored in the memory unit each of which causes the central processing unit to apply to input data a process for detecting and replacing predetermined data in the input data, wherein each of the plurality of filter processing modules causes the central processing unit to perform a process, if an enable flag of the filter processing module is in an on state, and, if the filter processing module has caused the central processing unit to replace data, the filter processing module causes the central processing unit to set an execution flag of the filter processing module to an on state; and
a control unit configured to cause the central processing unit to set enable flags of all of the plurality of filter processing modules to the on state at a start of a predetermined mode, to provide data to the plurality of filter processing modules, and to maintain the on state of only each enable flag of each filter processing module whose execution flag is in the on state after the predetermined mode ends.

21. A method for controlling operation of an image processing apparatus including a central processing unit, a memory unit coupled to the central processing unit, and a plurality of filter processing modules stored in the memory unit each of which causes the central processing unit to apply a process to predetermined data in input data, the method comprising:
a detecting step of detecting, by the processor, a filter processing module that previously has performed processing of the input data in a predetermined mode; and
a setting step of making, by the processor, a setting that enables a filter processing module detected in the detecting step, after the predetermined mode ends.

22. A method for controlling operation of an image processing apparatus including a central processing unit, a memory unit coupled to the central processing unit, and a plurality of filter processing modules stored in the memory unit each of which causes the central processing unit to apply to input data a process for detecting and replacing predetermined data in the input data, wherein each of the plurality of filter processing modules causes the central processing unit to perform a process, if an enable flag of the filter processing module is in an on state, and, if the filter processing module has replaced data, an execution flag of the filter processing module is set to an on state, the method comprising:
a first step of turning on, by the processor, enable flags of all the plurality of filter processing modules at a start of a predetermined mode and providing data to the plurality of filter processing modules; and
a second step of maintaining, by the processor, the on state of only each enable flag of each filter processing module whose execution flag is in an on state after the predetermined mode ends.

23. A computer-readable storage medium storing a control program for causing a computer to perform the method for controlling an image processing apparatus according to claim 10.

24. A computer-readable storage medium storing a control program for causing a computer to perform the method for controlling an image processing apparatus according to claim 11.

25. A computer-readable storage medium storing a control program for causing a computer to perform the method for controlling operation of filter processing module according to claim 21.

26. A computer-readable storage medium storing a control program for causing a computer to perform the method for controlling operation of filter processing modules according to claim 22.

* * * * *